United States Patent [19]
Kamo

[11] 3,856,623
[45] Dec. 24, 1974

[54] FUEL ASSEMBLY FOR NUCLEAR REACTOR

[75] Inventor: Yasuo Kamo, Hitachi, Japan

[73] Assignee: Hitachi, Ltd., Tokyo, Japan

[22] Filed: Aug. 2, 1972

[21] Appl. No.: 277,232

[30] Foreign Application Priority Data
Aug. 6, 1971  Japan.............................. 46-59049

[52] U.S. Cl.................. 176/78, 220/23.6, 220/97 D
[51] Int. Cl............................................... G21c 3/30
[58] Field of Search ...... 176/76, 78; 220/23.6, 22.3, 220/97 C, 97 D

[56] References Cited
UNITED STATES PATENTS

| | | | |
|---|---|---|---|
| 3,142,627 | 7/1964 | Emerson................................ | 176/78 |
| 3,259,263 | 7/1966 | Tohchung Wei .............. | 220/23.6 X |
| 3,389,056 | 6/1968 | Frisch................................... | 176/78 |
| 3,689,358 | 9/1972 | Smith et al.............................. | 176/78 |
| 3,733,252 | 5/1973 | Georges et al......................... | 176/76 |

Primary Examiner—Benjamin R. Padgett
Assistant Examiner—P. A. Nelson
Attorney, Agent, or Firm—Craig & Antonelli

[57] ABSTRACT

A fuel assembly for nuclear reactor is comprised of a plurality of fuel rods for nuclear reactor, two upper and lower tie plates for holding the fuel rods at their upper and lower ends, two mounting frames, each being fixed to the respective tie plate, and segment spacers between the mounting frames. By the engagement of the segment spacers with the mounting frames, complicated processing of the conventional connector fuel rods is eliminated, and a danger is damages to thermal strain can be reduced because of less welding parts, which have been deemed as a major cause for fuel damage.

9 Claims, 9 Drawing Figures

FUEL ASSEMBLY FOR NUCLEAR REACTOR

This invention relates to a fuel assembly for a nuclear reactor, and more particularly to a fuel assembly based on the use of stacked type spacer for a boiling water-type nuclear reactor.

Generally, the fuel assembly for the boiling water-type nuclear reactor comprises 49 fuel rods arranged in a square form at equal distances and fixed by tie plates at their top and bottom, and spacers at several intermediate locations, and has such a structure that the difference in thermal expansion can be absorbed thereby. Where there is a deviation in the distances of the fuel rod in such fuel assembly, heat is locally generated, and there is a danger which is connected to damages of the fuel rods. Therefore, the role of fuel rod supporting, especially that of the intermediate spacers, is important in the fuel assembly.

When the spacers are inserted into the fuel assembly, a method for holding the spacers in a longitudinal direction is a problem. The conventional spacers are held in the longitudinal direction by engaging or hooking the spacer with a lobe of a connector fuel rod inserted into the middle position of the fuel assembly. The connector fuel rod is prepared by welding a connector terminal plug provided with lobes for hooking the spacers in number of the spacers to be inserted in the longitudinal direction, onto a shield pipe at each segment, and the spacers are held by the connector fuel rods inserted at the middle position of the fuel assembly.

An object of the present invention is to provide a structure based on a system for holding fuel rods by segment spacers, whose engagement and disengagement are readily carried out, in place of the connector fuel rods to avoid damages of the fuel rods by said local heat generation and complicated processing of the connector fuel rods.

The present invention is characterized, first of all, by a combination of two tie plates for holding the fuel rods at their upper and lower ends, two upper and lower mounting frames provided between the tie plates and fixed thereto, and a plurality of segment spacers positioned between the mounting frames.

The present invention is further characterized in that the mounting frames can be readily engaged or disengaged with the segment spacers by a plug-in type manner, in addition to said first feature.

According to the present invention, the complicated processing of the connector fuel rod can be eliminated, and accordingly its processing cost can be reduced. Furthermore, the damage of the fuel rods due to the local heat generation caused by improper arrangement of the fuel rods and the resulting thermal strain can be prevented in advance. These are the effects of the present invention.

Now, the present invention will be explained, referring to the accompanying drawings.

Figure 1:
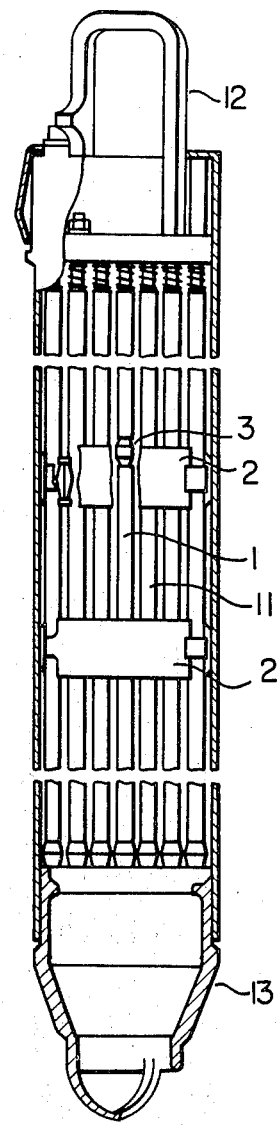
FIG. 1 shows an exterior view of the convertional fuel assembly for the nuclear reactor.

In FIG. 1, numeral 1 is a connector fuel rod, 2 a spacer, 3 a lobe for the connector fuel rod, 11 a fuel rod, and 12 and 13 are an upper tie plate and a lower tie plate, respectively.

Figure 2:
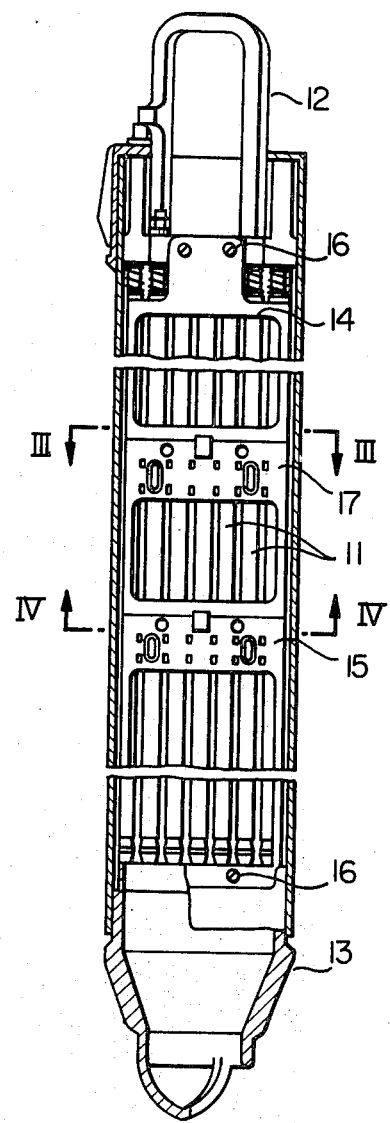
FIG. 2 shows an exterior view of the fuel assembly for the nuclear reactor of the present invention.

In FIG. 2, the fuel rods 11 are held by the upper tie plate 12, and the lower tie plate 13 at their upper and lower ends, respectively, to form a fuel assembly. An upper mounting frame 14 and a lower mounting frame 15 are fixed to the upper tie plate 12 and the lower tie plate 13 by screws 16, etc., respectively.

Between these two upper and lower mounting frames 14 and 15, the necessary number of segment spacers 17 are inserted.

Figure 3:
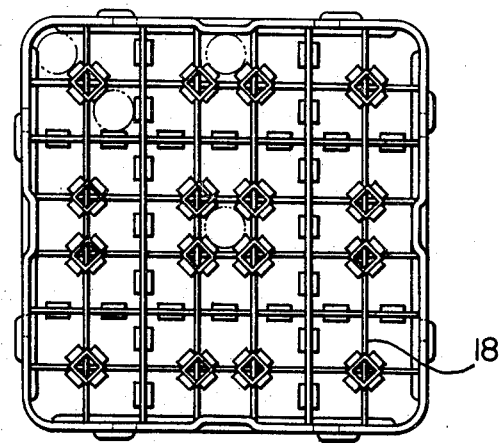
FIG. 3 is a view along the line III—III of FIG. 2.
Figure 4:
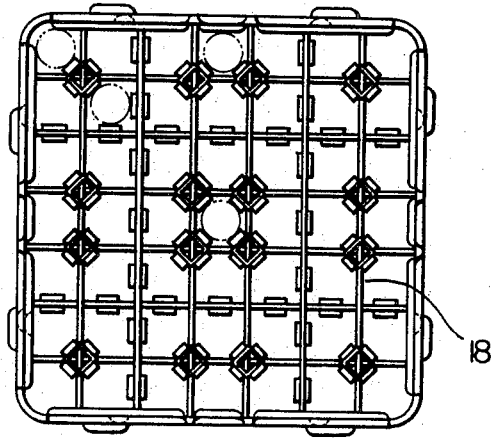
FIG. 4 is a view along the line IX — IX of FIG. 2.

In FIGS. 3 and 4, numeral 18 is a spacer, and the necessary number of segment spacers 17 having the spacers 18 are inserted between the two upper and lower mounting frames of FIG. 2 to hold the fuel rods at an appropriate distance.

Figure 5:
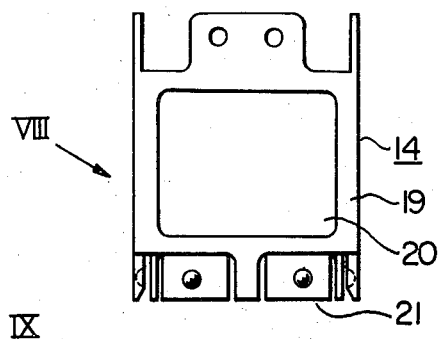
FIG. 5 is a vertical view of the upper mounting frame of the present invention.
Figure 6:
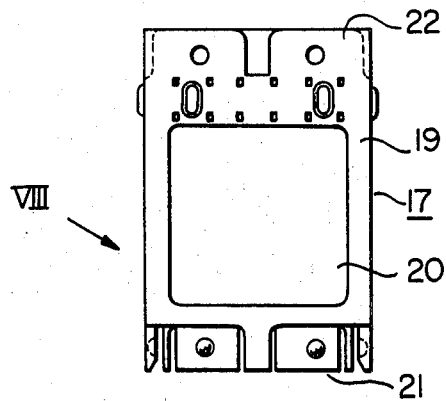
FIG. 6 is a vertical view of the segment spacer of the present invention.
Figure 7:
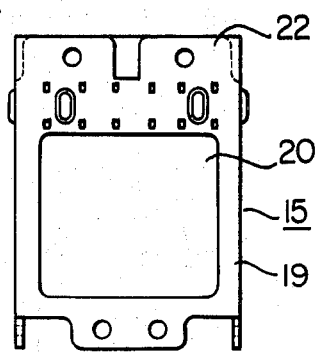
FIG. 7 is a vertical view of the lower mounting frame of the present invention.

FIGS. 5 to 7 shows side views of the upper mounting frame 14, the segment spacer 17 and the lower mounting frame 15, respectively. In FIGS. 5 to 7, numeral 19 represents a side frame plate and the necessary part 20 is cut away to make the absorption of mention less. The distance of one spacer to another is determined by the length of the side frame plate 19 of the segment spacer 17. Further, the lower ends of the upper mounting frame 14 and the segment spacer 17 are provided with male connecting parts 21, and the upper ends of the segment spacer 17 and the lower mounting frame are provided with the female connecting parts 22.

Figure 8:
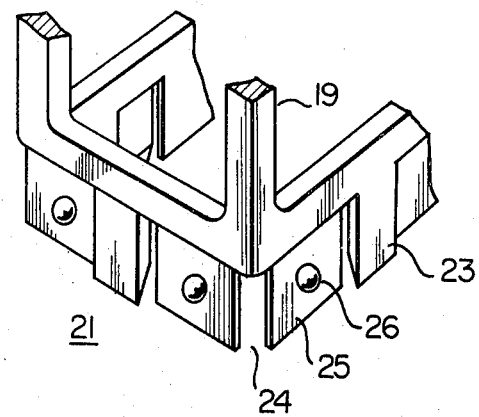
FIG. 8 is a partial schematic view of the male connecting part of the present invention, taken from the viewpoint VIII of FIG. 6.
Figure 9:
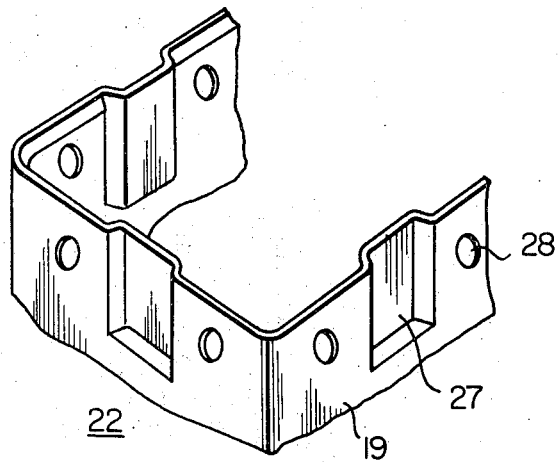
FIG. 9 is a partial schematic view of the female connecting part of the present invention, taken from the viewpoint IX of FIG. 7.

In FIG. 8, the male connecting part 21 is illustrated. In the side frame plate 19, tapered guide plates 23 are provided, while corner parts 24 are cut away. Plate-shaped connection springs 25 are provided at the inside surfaces of the side frame plate, and pivots 26 are provided on the springs 25. In FIG. 9, a female connecting part, which is to be engaged with the male connecting part, is illustrated.

The tapered side frame plate 19 is pressed inwards so as to form a groove 27, into which said guide plate 23 is to be inserted. On the other hand, the necessary number of openings 28, into which said pivots 26 are to be engaged, is provided on the side frame plate 19.

The present invention is based on such a structure as described above. When the mounting frame 14 and 15 are connected to the segment spacer 17, the guide plates 23 are inserted into the corresponding guide grooves 27, and the pivots 26 provided on the connecting springs 25 are engaged into the openings 28, while guiding the guide plates 23 into the guide grooves 27.

The guide plates 23 serve to firmly secure the connecting parts after the engagement.

When the fuel elements are assembled, the lower mounting plate 15 is fixed to the lower tie plate 13 by screws 16, etc. Then, the necessary number of the segment spacers 17 are stacked by said connecting means, and the necessary stages of the spacers 18 are thereby provided.

Then, the fuel rods 11 are inserted into the lower tie plate through the spacers 18, and the upper mounting frame 14 is connected to the topmost spacer 17. The upper tie plate 12 is fixed to the upper mounting frame 14 by screws 16, etc., and at the same time the fuel rods 11 are engaged with the upper tie plate 12.

According to the present invention, the fuel rods can be held in a longitudinal direction of the spacers without the use of the connector fuel rods, and therefore the welding parts, which are most susceptible to the damages of the fuel rods, can be reduced.

Furthermore, the present invention is based on the plug-in, stacked type spacer structure, and therefore the exchange of the fuel rods can be carried out readily. Since the fuel assembly is connected to the side frame plates from the top to the bottom, the fuel rods are greatly reinforced. These are the advantages attained by the present invention.

The male and female connecting parts used in the engagement of the upper and lower mounting frames with the segment spacers are not restricted to the combination and structure as shown in FIGS. 5 to 7.

What is claimed is:

1. A fuel assembly for a nuclear reactor, said assembly comprising a plurality of fuel rods, an upper tie plate and a lower tie plate provided, respectively, at upper and lower ends of the fuel rods for holding the fuel rods, an upper mounting frame and a lower mounting frame provided adjacent to the respective tie plates to surround the fuel rods, a plurality of segment spacers arranged between said upper and lower mounting frames to surround the fuel rods and hold the fuel rods at an appropriate separation, and connecting parts on facing end portions of said upper and lower mounting frames and each of said plurality of segment spacers to connect the mounting frames to said segment spacers and to connect adjacent segment spacers together, and wherein said connecting parts include a combination of guide plates and pivots in engaging relationship to a combination of guide grooves and openings.

2. A fuel assembly for a nuclear reactor, said assembly comprising a plurality of fuel rods, an upper tie plate and a lower tie plate provided, respectively, at upper and lower ends of the fuel rods for holding the fuel rods, an upper mounting frame and a lower mounting frame provided adjacent to the respective tie plates to surround the fuel rods, a plurality of segment spacers arranged between said upper and lower mounting frames to surround the fuel rods and hold the fuel rods at an appropriate separation, and connecting parts on facing end portions of said upper and lower mounting frames and each of said plurality of segment spacers to connect the mounting frames to said segment spacers and to connect adjacent segment spacers together, and wherein said connecting parts include a combination of guide plates and pivots provided on connecting springs on one of said facing portions of said upper and lower mounting frames and said segment spacers, and guide grooves and openings, respectively, on a corresponding facing portion of another said mounting frame and segment spacer.

3. A fuel assembly for a nuclear reactor, said assembly comprising a plurality of fuel rods, an upper tie plate and a lower tie plate provided, respectively, at upper and lower ends of the fuel rods for holding the fuel rods, an upper mounting frame and a lower mounting frame provided adjacent to the respective tie plates to surround the fuel rods, a plurality of segment spacers arranged between said upper and lower mounting frames to surround the fuel rods and hold the fuel rods at an appropriate separation, and connecting parts on facing end portions of said upper and lower mounting frames and each of said plurality of segment spacers to connect the mounting frames to said segment spacers and to connect adjacent segment spacers together, said connecting parts being male connecting parts and female connecting parts, said male connecting parts being connectable with said female connecting parts, wherein said male connecting parts are provided at one of said mounting frames at positions facing the segment spacers, and said female connecting parts are provided at the segment spacers at positions facing said one mounting frame, and wherein said male connecting parts are formed of a combination of a plurality of guide plates and pivots, and wherein said female connecting parts are formed of a combination of a plurality of guide grooves and openings.

4. A fuel element according to claim 3, wherein said guide plates are axially inserted into said guide grooves and said pivots are engaged into said openings.

5. A fuel element according to claim 4, wherein said pivots are provided on plate-shaped connection springs adjacent to said guide plates.

6. A fuel element according to claim 4, wherein said guide plate and said guide grooves are tapered.

7. A fuel assembly for a nuclear reactor according to claim 3 wherein said male connecting parts are further provided at segment spacers at positions facing one of said mounting frames, and said female connecting parts are further provided at said one mounting frame at positions facing the segment spacers.

8. A fuel assembly according to claim 3 wherein a lattice of spacers is fixed to internal walls of each of said plurality of segment spacers to hold the fuel rods at the appropriate separation.

9. A fuel element according to claim 7, wherein said one mounting frame is said lower mounting frame.

* * * * *